US012800484B2

(12) United States Patent
Lee et al.

(10) Patent No.: US 12,800,484 B2
(45) Date of Patent: Nov. 17, 2026

(54) OPTICAL IMAGING DEVICE

(71) Applicant: SAMSUNG ELECTRONICS CO., LTD., Suwon-si (KR)

(72) Inventors: Jinwoo Lee, Suwon-si (KR); Seungryeol Oh, Suwon-si (KR); Hidong Kwak, Suwon-si (KR); Jeongho Ahn, Suwon-si (KR); Seongsil Lee, Suwon-si (KR); Suyoung Lee, Suwon-si (KR); Hyeongcheol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/775,796

(22) Filed: Jul. 17, 2024

(65) Prior Publication Data

US 2025/0027875 A1 Jan. 23, 2025

(30) Foreign Application Priority Data

Jul. 19, 2023 (KR) ........................ 10-2023-0094021

(51) Int. Cl.
*G01N 21/31* (2006.01)

(52) U.S. Cl.
CPC ....... *G01N 21/31* (2013.01); *G01N 2201/021* (2013.01); *G01N 2201/06113* (2013.01)

(58) Field of Classification Search
CPC ............. G01N 21/31; G01N 2201/021; G01N 2201/06113; G01N 21/8851; G01N 21/9501; G01N 2021/8854; G01N 2021/8887; G01N 2201/068; G01J 3/10; G01J 3/0208; G01J 3/0213; G01J 3/0224; G01J 3/18; G01J 3/2823; G01J 3/2803; H10P 74/203; H10P 74/235
USPC .......................................................... 356/326
See application file for complete search history.

(56) References Cited

U.S. PATENT DOCUMENTS

| | | | |
|---|---|---|---|
| 8,384,887 | B2 | 2/2013 | Lange et al. |
| 9,355,208 | B2 | 5/2016 | Shifrin et al. |
| 10,992,924 | B2 | 4/2021 | Wang et al. |
| 11,562,584 | B2 | 1/2023 | Park et al. |

(Continued)

FOREIGN PATENT DOCUMENTS

| | | | |
|---|---|---|---|
| CN | 112462507 | A | 3/2021 |
| CN | 113959969 | A | 1/2022 |

(Continued)

*Primary Examiner* — Md H Rahman
(74) *Attorney, Agent, or Firm* — Sughrue Mion, PLLC

(57) ABSTRACT

An optical imaging device includes a pulse generator including a pulse generating device configured to generate pulse lasers and a pulse expander configured to receive a pulse laser from the pulse generating device, and generate a broadened pulse laser by expanding a spectrum and width of the received pulse laser, an optical assembly including an objective lens configured to receive the broadened pulse laser and pass the received broadened pulse laser to a target object, and a light receiver including a light receiving device configured to receive a reflected pulse laser corresponding to the broadened pulse laser reflected from the target object and convert the reflected pulse laser into an electrical signal, and at least one processor configured to generate a spectral image set based on the electrical signal generated by the light receiving device.

4 Claims, 6 Drawing Sheets

(56) References Cited

U.S. PATENT DOCUMENTS

| | | | | |
|---|---|---|---|---|
| 2004/0207850 | A1* | 10/2004 | Kwak .................. | G01N 21/636<br>356/432 |
| 2023/0099128 | A1 | 3/2023 | Zeng et al. | |

FOREIGN PATENT DOCUMENTS

| | | | |
|---|---|---|---|
| JP | 2022-165532 | A | 11/2022 |
| JP | 2022-175008 | A | 11/2022 |
| KR | 10-1603726 | B1 | 3/2016 |

* cited by examiner

OPTICAL IMAGING DEVICE

CROSS-REFERENCE TO RELATED APPLICATION

This application is based on and claims priority under 35 U.S.C. § 119 to Korean Patent Application No. 10-2023-0094021, filed on Jul. 19, 2023, in the Korean Intellectual Property Office, the disclosure of which is incorporated by reference herein in its entirety.

BACKGROUND

Example embodiments of the disclosure relate to an optical imaging device capable of generating spectral images.

Hyper spectral imaging (HSI) refers to a technology that obtains a spectrum for each pixel to evaluate the quality of an inspection object. An HSI device may generate a hyper-spectral image including multiple spectra of a line-shaped image through a single measurement. A related art HSI device may obtain a two-dimensional image depending on the wavelength of the inspection objection by scanning the inspection object in a direction perpendicular to the line extension direction of the hyperspectral image.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide an optical imaging device with improved performance and reliability.

Additional aspects will be set forth in part in the description which follows and, in part, will be apparent from the description, or may be learned by practice of the presented embodiments.

According to an aspect of an example embodiment, an optical imaging device may include a pulse generator including a pulse generating device configured to generate pulse lasers and a pulse expander configured to receive a pulse laser from the pulse generating device, and generate a broadened pulse laser by expanding a spectrum and width of the received pulse laser, an optical assembly including an objective lens configured to receive the broadened pulse laser and pass the received broadened pulse laser to a target object, and a light receiver including a light receiving device configured to receive a reflected pulse laser corresponding to the broadened pulse laser reflected from the target object and convert the reflected pulse laser into an electrical signal, and at least one processor configured to generate a spectral image set based on the electrical signal generated by the light receiving device, the spectral image set including a plurality of spectral images generated based on one reflected pulse laser received by the light receiving device.

According to an aspect of an example embodiment, a hyper-spectral imaging device may include a femtosecond pulse generating device configured to generate pulse lasers, a pulse expander configured to receive a pulse laser from the femtosecond pulse generating device and generate a broadened pulse laser by expanding a spectrum and a width of the received pulse laser, an intermediate beam splitter configured to receive a broadened pulse laser from the pulse expander and branch a first portion of the received broadened pulse laser and transmit a second portion of the received broadened pulse laser, an intermediate light receiving device configured to receive the first portion of the broadened pulse laser branched from the intermediate beam splitter, a first beam splitter configured to receive the second portion of the broadened pulse laser and output the second portion of the broadened pulse laser in one direction, an objective lens configured to receive the second portion of the broadened pulse laser and pass the received second portion of the broadened pulse laser to a target object, an intensified charged coupled device (ICCD) configured to receive a reflected pulse laser corresponding to the second portion of the broadened pulse laser reflected from the target object and convert the reflected pulse laser into a first electrical signal, and at least one processor configured to generate a three-dimensional (3D) hypercube including a plurality of spectral images based on the first electrical signal, receive an intermediate electrical signal generated based on the first portion of the broadened pulse laser and normalize the 3D hypercube based on the intermediate electrical signal.

According to an aspect of an example embodiment, a hyper-spectral imaging device may include a femtosecond pulse generating device configured to generate pulse lasers, a pulse expander configured to receive a pulse laser from the femtosecond pulse generating device and generate a broadened pulse laser by expanding a spectrum and a width of the received pulse laser, an intermediate beam splitter configured to receive a broadened pulse laser from the pulse expander and branch a first portion of the received broadened pulse laser and transmit a second portion of the received broadened pulse laser, an intermediate light receiving device configured to receive the first portion of the broadened pulse laser branched from the intermediate beam splitter, a first beam splitter configured to receive the second portion of the broadened pulse laser and outputs the second portion of the broadened pulse laser in one direction, an objective lens configured to receive the second portion of the broadened pulse laser and pass the received second portion of the broadened pulse laser to a target object, an ICCD configured to receive a reflected pulse laser corresponding to the second portion of the broadened pulse laser reflected from the target object, and convert the reflected pulse laser into a first electrical signal, and at least one processor configured to generate a 3D hypercube including a plurality of spectral images based on the first electrical signal, divide one reflected pulse laser into N segments based on a reception time of each portion of the reflected pulse laser, generate a spectral image for each of the first to Nth segments in order of reception time, wherein the 3D hypercube includes a first spectral image corresponding to the first segment, to an N-th spectral image corresponding to the N-th segment, receive an intermediate electrical signal generated based on the first portion of the broadened pulse laser, and normalize the 3D hypercube based on the intermediate electrical signal, where N is a natural number of 2 or more and the smaller of a repetition rate of the femtosecond pulse generating device and a sampling frequency of the ICCD is equal to or greater than a number of generations of per second of the 3D hypercube.

BRIEF DESCRIPTION OF DRAWINGS

Additional aspects will be set forth in part in the description which follows and, in part, will be apparent from the description, or may be learned by practice of the presented embodiments.

DETAILED DESCRIPTION

Figure 1:
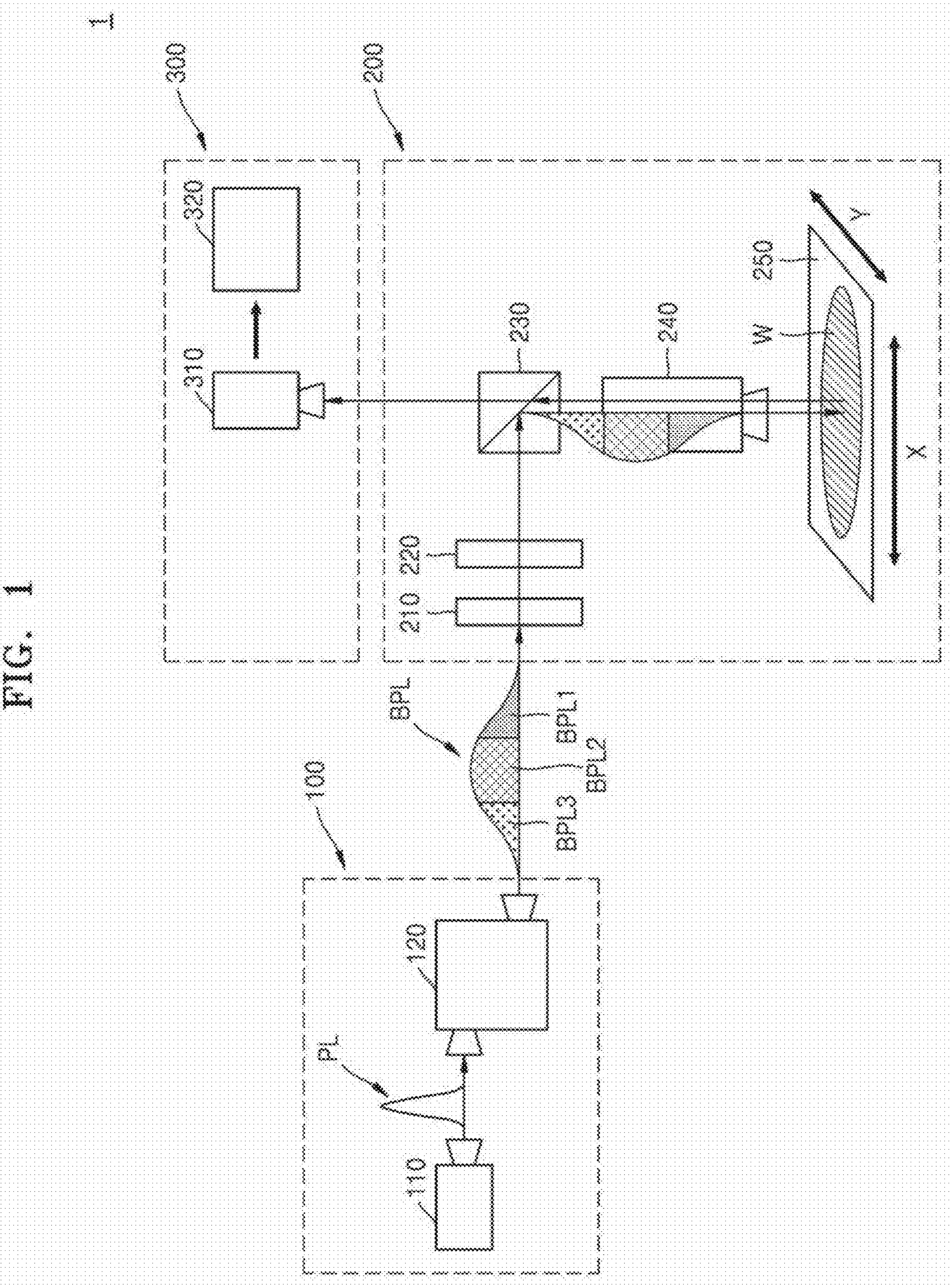
FIG. 1 is a diagram illustrating an optical imaging device according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating an optical imaging device 1 according to one or more embodiments.

Referring to FIG. 1, the optical imaging device 1 according to an embodiment may include a pulse generator 100, an optical assembly 200, and a light receiver 300. The pulse generator 100 may include a pulse generating device 110 and a pulse expander 120. The optical assembly 200 may include a first filter 210, a second filter 220, a first beam splitter 230, an objective lens 240, and a stage 250. The light receiver 300 may include a light receiving device 310 and a processor 320.

In general terms, the pulse generating device 110 may be a pulse laser generator and may periodically emit pulse laser PL. Pulses may be referred to as pulsed lasers. The pulse expander 120 may broaden the pulse laser PL arriving from the pulse generating device 110.

The broadened pulse laser BPL, which is a pulse laser PL broadened through the pulse expander 120, may enter the optical assembly 200. The broadened pulse laser BPL may be referred to as broadened pulse. The broadened pulse laser BPL may pass through the first filter 210 and the second filter 220. Thereafter, the broadened pulse laser BPL may be directed to the objective lens 240 through the first beam splitter 230. The broadened pulse laser BPL that passes through the objective lens 240 may be reflected from the surface of an object placed on the stage 250. In The object placed on the stage 250 may be a wafer W or other objects as will be understood by one of ordinary skill in the art from the disclosure herein. The substrate may include the wafer W.

A reflected pulse laser RPL generated by reflecting the broadened pulse laser BPL from the wafer W may enter the light receiver 300. The processor 320 may receive an electrical signal converted into a reflected pulse laser RPL from the light receiving device 310 to generate a spectral image.

The first filter 210 may be a neutral-density (ND) filter. The ND filter may equally reduce or modify the intensity of all wavelengths of light incident on the filter so as not to change the hue of color rendition. Through the first filter 210, the reflection characteristics of the surface of the wafer W may be measured and the appropriate intensity of the broadened pulse laser BPL may be maintained in the process of imaging the pattern that includes defects.

The second filter 220 may be a polarizing filter. The second filter 220 may polarize the broadened pulse laser BPL that passes through the second filter 220. By adjusting the polarization direction or degree of polarization of the second filter 220, the broadened pulse laser BPL may be polarized and made incident on the wafer W. The broadened pulse laser BPL polarized through the second filter 220 may exhibit specific optical characteristics when interacting with the surface of the wafer W. For example, optical characteristics, such as shape, size, optical reflection, and refraction of surface defects of the wafer W may be reflected in the reflected pulse laser RPL generated by reflection of the broadened pulse laser BPL on the surface of the polarized wafer W.

The stage 250 may move the wafer W in the first direction (X direction) and/or the second direction (Y direction) with respect to the objective lens 240. By moving the wafer W with respect to the objective lens 240 and controlling the portion where the broadened pulse laser BPL is reflected on the wafer W through moving the stage 250, at least a partial area of the wafer W may be imaged. The objective lens 240 may move in a vertical direction with respect to the stage 250, the stage 250 may move in a vertical direction with respect to the objective lens 240, and/or the objective lens 240 and the stage 250 may each move in the vertical direction.

The reflected pulse laser RPL that reaches the light receiving device 310 of the light receiver 300 may be converted into an electrical signal. The electrical signal converted from the reflected pulse laser RPL may be transmitted to the processor 320. In the processor 320, one spectral image set may be generated based on the electrical signal generated from one reflection pulse laser RPL. One spectral image set generated based on the electrical signal may include a plurality of spectral images. The spectral image set may be referred to as a three-dimensional (3D) data set or 3D data cube in a hyper-spectral imaging device. In the disclosure, the 3D data set may be a collection of spectral images which is expressed as a function of the first axis (X-axis) and the second axis (Y-axis) corresponding to the spatial coordinates of the spectral image and the time axis related to the wavelength of the spectrum and output as light intensity.

Figure 2:
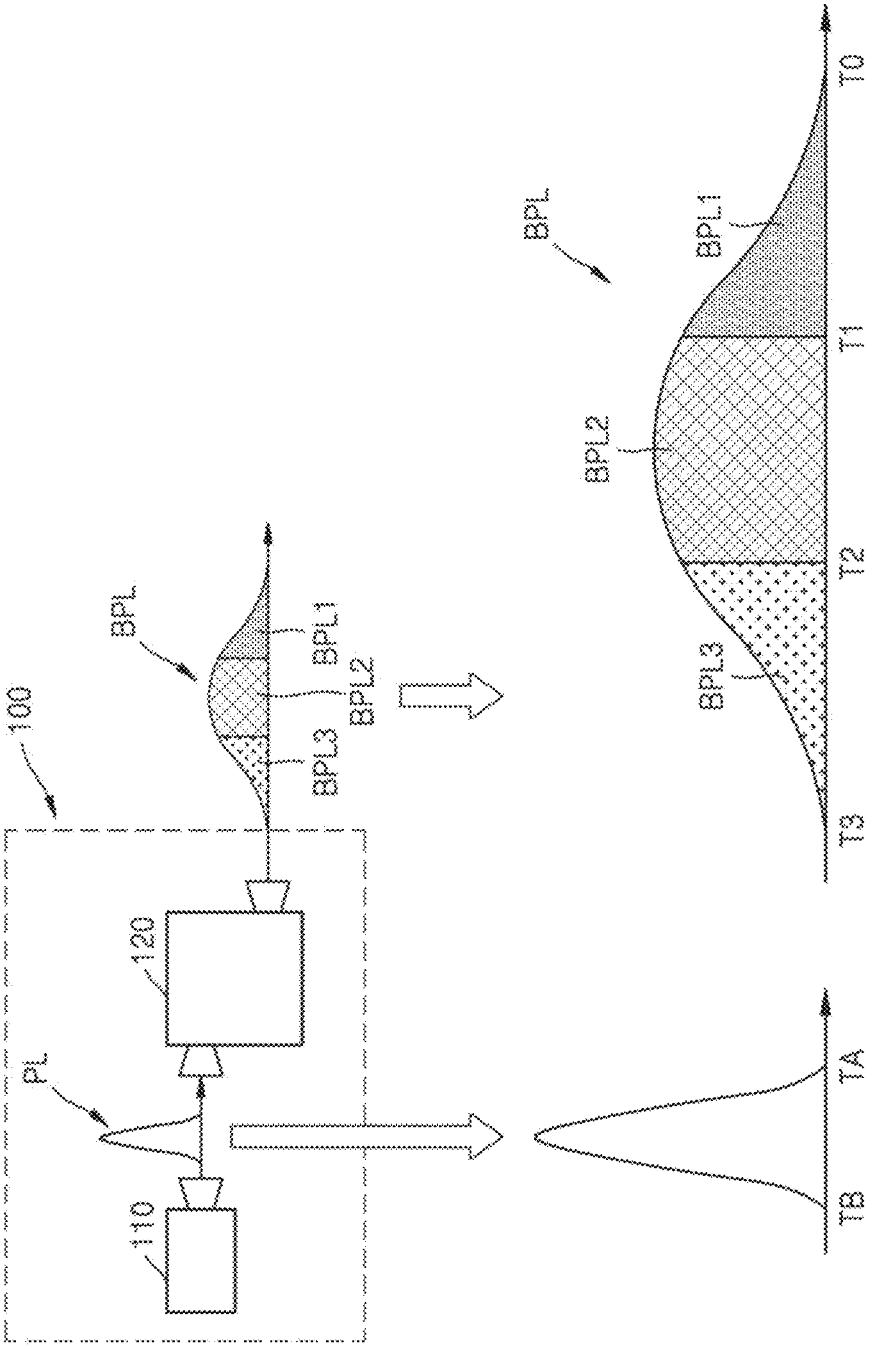
FIG. 2 is a diagram illustrating a pulse generator of an optical imaging device according to one or more embodiments.

FIG. 2 is a diagram illustrating a pulse generator 100 of an optical imaging device 1 according to one or more embodiments.

Referring to FIGS. 1 and 2, the pulse generating device 110 may generate a pulse laser PL. For example, the pulsed laser PL may have a pulse width of about 100 femtoseconds to about 1 nanosecond. That is, the pulse laser PL may have a pulse width corresponding to the difference between time TA and time TB. For example, when a laser pulse with a pulse width of several femtoseconds or more is amplified, an output of several terawatts may be produced.

The pulse expander 120 may expand the pulse laser PL that has entered the pulse expander 120 through chromatic dispersion. In more detail, the spectrum of the pulse laser PL may be broadened, and thus the full width at half maximum (FWHM) of the pulse laser PL may be lengthened.

For example, the pulse expander 120 may have two or more mirrors, and incident light may be reflected multiple times between the mirrors. A nonlinear medium may be provided on at least some of the mirrors, or a nonlinear optical medium may be disposed on an optical path through which light is reflected multiple times between the mirrors. The nonlinear optical medium may disperse light depending on the wavelength and frequency of the optical elements that make up the light. The nonlinear optical medium may have a solid, liquid, or gas phase.

In another example, the pulse expander 120 may include a fiber optic component. The fiber optic component may have a nonlinear optical medium inside. When a pulse laser PL is incident on the fiber optic component provided with the nonlinear optical medium, dispersion may occur in the pulse laser PL due to the Kerr effect. When dispersion occurs in the dispersed pulse laser PL, the spectrum of the pulse laser PL is expanded. That is, the pulse laser PL entering the pulse expander 120 may become the broadened pulse laser BPL through the pulse expander 120.

In another example, the pulse expander 120 may include grating. The light reflected by the grating may be reflected with different reflection angles depending on the wavelength, and through this, the spectrum of the pulse laser PL may be expanded.

In an embodiment, the pulse laser PL incident on the pulse expander 120 may be output as a broadened pulse laser BPL. The broadened pulse laser BPL may be configured with a relatively long wavelength spectrum in the temporally early segment of the broadened pulse laser BPL and a relatively short wavelength spectrum in the temporally later segment of the broadened pulse laser BPL. Alternatively, if necessary, the broadened pulse laser BPL may be configured with a relatively short wavelength spectrum in a temporally early segment of the extended pulse laser and a relatively long wavelength spectrum in the temporally later segment of the broadened pulse laser BPL The broadened pulse laser BPL is described as an example where the broadened pulse laser BPL includes a spectrum with a relatively long wavelength in the temporally early segment of the broadened pulse laser BPL and a spectrum with a relatively short wavelength in the temporally later segment of the broadened pulse laser BPL, but the disclosure is not limited thereto.

As shown in FIG. 2, the length of the pulse laser PL may be extended to the length of the broadened pulse laser BPL through the pulse expander 120. The extent to which the broadened pulse laser BPL is expanded compared to the pulse laser PL may be related to the output of the pulse laser PL and the number of spectral images included in the spectral image set, which is described below. For example, the half width of the broadened pulse laser BPL that has passed through the pulse expander 120 may be 2 to 10 times the half width of the pulse laser PL before expansion. However, numerical comparison between broadened pulse laser BPL and pulse laser PL does not limit the disclosure.

The broadened pulse laser BPL may have a longer half width than the pulse laser PL. However, because the spectrum of the broadened pulse laser BPL is an expanded spectrum of the pulse laser PL, it is necessary to distinguish between lengthening the half width of the broadened pulse laser BPL and expanding the spectrum of the broadened pulse laser BPL.

The broadened pulse laser BPL output from the pulse expander 120 may proceed to the optical assembly 200. As in the above-mentioned example, the broadened pulse laser BPL may be developed by forming each spectral wavelength in a long sequence. Referring to FIG. 2, the broadened pulse laser BPL may include a first broadened pulse laser BPL1, a second broadened pulse laser BPL2, and a third broadened pulse laser BPL3.

As an embodiment, the broadened pulse laser BPL may be divided into three segments based on the arrival time of the broadened pulse laser BPL, and the three segments may be referred to as the first broadened pulse laser BPL1, the second broadened pulse laser BPL2, and the third broadened pulse laser BPL3. The first broadened pulse laser BPL1 may represent the range from the start time T0 to the first time T1 of the broadened pulse laser BPL, the second broadened pulse laser BPL2 may represent the range from the first time T1 to the second time T2 of the broadened pulse laser BPL, and the third broadened pulse laser portion BPL3 may represent the range from the second time T2 to the third time T3 of the broadened pulse laser BPL. However, dividing the broadened pulse laser BPL into three segments is only an example, and the disclosure is not limited thereto.

The broadened pulse laser BPL that has passed through the pulse expander 120 may be divided into the first broadened pulse laser BPL1, the second broadened pulse laser BPL2, and a third broadened pulse laser BPL3 in the order of the longest wavelength of the spectrum. For example, when the entire spectrum of the broadened pulse laser BPL has a wavelength band of about 300 nm to about 900 nm, the first broadened pulse laser BPL1 has a spectrum with a wavelength band of about 700 nm to about 900 nm, the second broadened pulse laser BPL2 has a spectrum with a wavelength band of about 500 nm to about 700 nm, and the third broadened pulse laser portion BPL3 has a spectrum with a wavelength band of about 300 nm to about 500 nm. However, the disclosure is not limited by the wavelength bands constituting the spectrum and the wavelength bands of the divided spectra.

Figure 3:
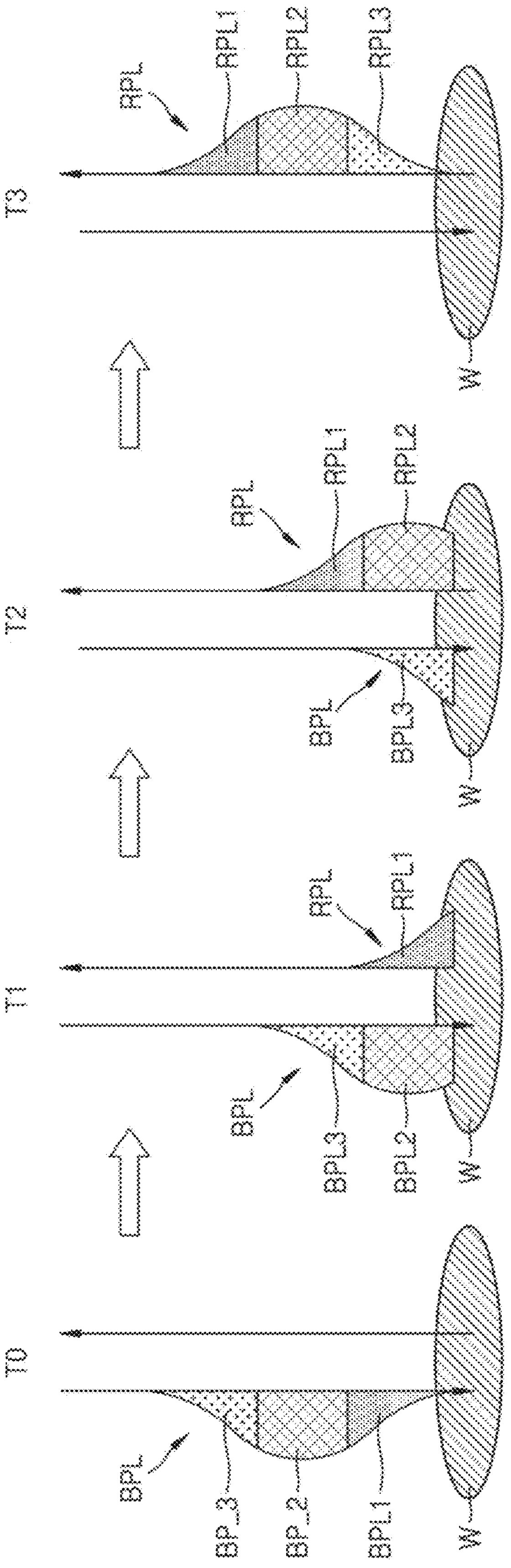
FIG. 3 is a diagram illustrating an optical imaging device according to one or more embodiments.

FIG. 3 is a diagram illustrating an optical imaging device 1 according to one or more embodiments.

Referring to FIGS. 1 and 3, after passing through the first filter 210 and the second filter 220, the broadened pulse laser BPL that has passed through the first beam splitter 230 may be directed to the objective lens 240. The objective lens 240 may have a normal configuration and may be configured to suit the measurement distance and measurement purpose of the object.

The broadened pulse laser BPL that has passed through the objective lens 240 may be reflected from the object from the start time T0, which is the time when the broadened pulse laser BPL reaches the wafer W, to the third time T3, which is the time when the end of the broadened pulse laser reaches the wafer W. That is, as shown in FIG. 3, the broadened pulse laser BPL may be reflected on the wafer W and may become a reflected pulse laser RPL. The reflected pulse laser RPL may be referred to as a reflection pulse laser, a reflection expansion pulse, or a reflection expansion pulse laser.

As mentioned above, the first broadened pulse laser portion BPL1 may be reflected on the wafer W, thereby generating the first reflected pulse laser portion RPL1. Likewise, the second broadened pulse laser portion BPL2 may be reflected on the wafer W, thereby generating the second reflected pulse laser portion RPL2. In addition, the third broadened pulse laser portion BPL3 may be reflected on the wafer W, thereby generating a third reflected pulse laser portion RPL3.

The reflected pulse laser RPL may include a first reflected pulse laser portion RPL1, a second reflected pulse laser portion RPL2, and a third reflected pulse laser portion RPL3. In the reflected pulse laser RPL, changes in the intensity of each spectrum affected by the shape and constituent materials of the wafer W, which is an object, may be reflected.

Figure 4:
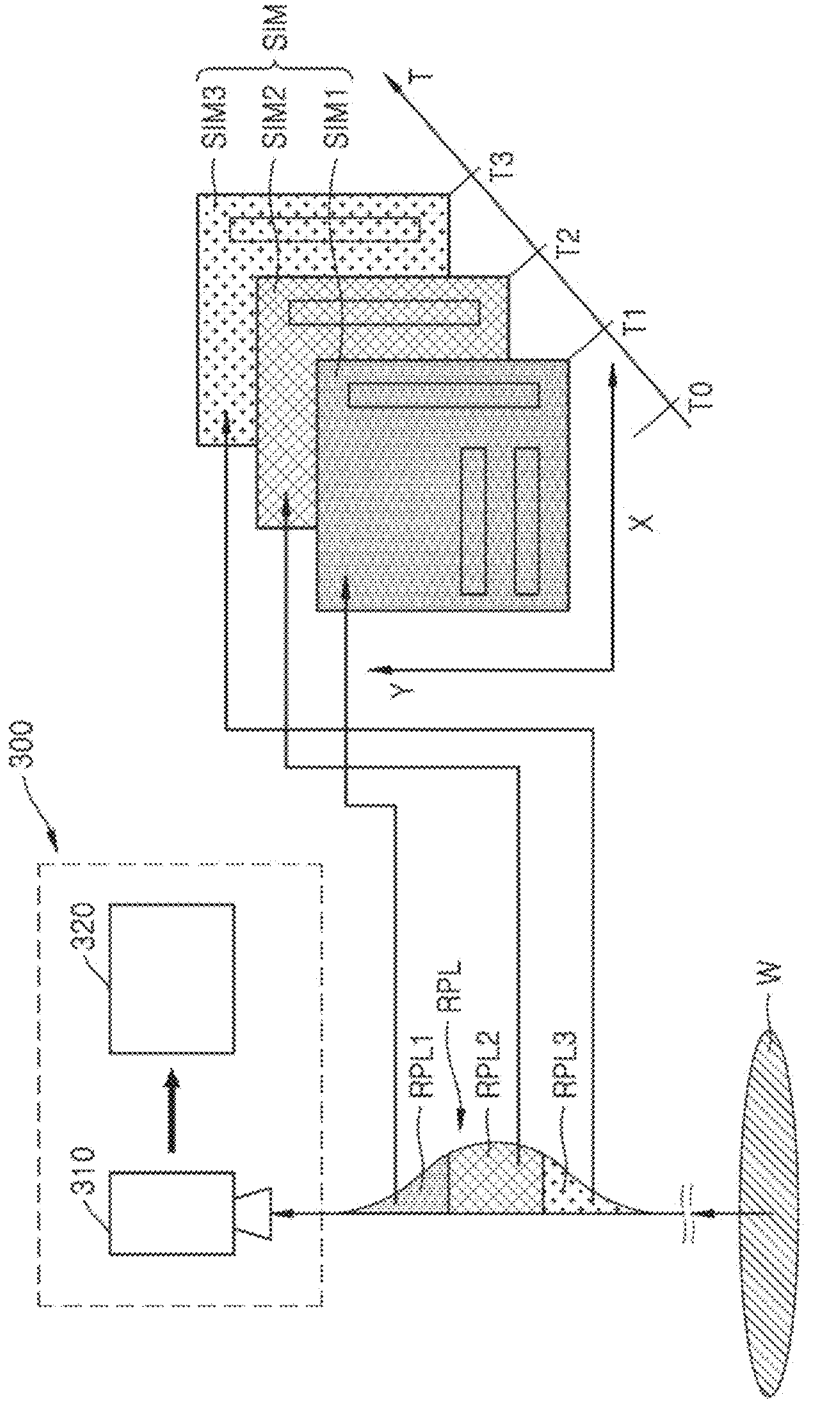
FIG. 4 is a diagram illustrating an optical imaging device according to one or more embodiments.

FIG. 4 is a diagram illustrating an optical imaging device 1 according to one or more embodiments.

Referring to FIGS. 1 and 4, the reflected pulse laser RPL that reaches the light receiving device 310 may be converted into an electrical signal through the light receiving device 310. The electrical signal may be transmitted to the processor 320 electrically connected to the light receiving device 310.

The light receiving device 310 may be, for example, an intensified charged coupled device (ICCD). The ICCD may amplify and detect low intensity light. The ICCD may include an image sensor and an optoelectronic amplifier.

For example, the processor 320 may divide the time from the start time T0, which is the time when the reflected pulse laser reaches the light receiving device 310, to the third time T3, which is the time when the end of the reflected pulse laser RPL reaches the light receiving device 310, into three time ranges. That is, the time range from the start time T0 to the third time T3 may be divided into a first segment from the start time T0 to the first time T1, a second segment from the first time T1 to the second time T2, and a third segment from the second time T2 to the third time T3. The time intervals of the first segment, the second segment, and the third segment may be the same or different from each other.

The first segment of the reflected pulse laser RPL may be processed to generate a first spectral image SIM1 by the processor 320. Likewise, the second segment may be processed to generate a second spectral image SIM2 by the processor 320. In addition, the third segment may be processed to generate a third spectral image SIM3 by the processor 320. The first spectral image SIM1, the second spectral image SIM2, and the third spectral image SIM3 may be grouped into one spectral image set.

Because the reflected pulse laser RPL is generated by reflection of the broadened pulse laser BPL from the wafer W the reflected pulse laser RPL may be composed of a spectrum with a relatively long wavelength in a temporally early segment of the reflected pulse laser RPL, and a spectrum with a relatively short wavelength in a temporally later segment of the reflected pulse laser RPL. Accordingly, the image sensor of the light receiving device 310 may receive a spectrum of wavelengths that change with time from each pixel constituting the image sensor. Because the wavelength of the spectrum of the received reflected pulse laser RPL changes along the time axis (T axis), which is described below, the spectral images depicted along the time axis (T axis) may be substantially the same as those along a wavelength range of the spectrum.

The wavelength of the spectrum of the first spectral image SIM1 may be longer than the wavelength of the spectrum of the second spectral image SIM2, and the wavelength of the spectrum of the second spectral image SIM2 may be longer than the wavelength of the spectrum of the third spectral image SIM3.

As in the previous example, when the entire spectrum of the broadened pulse laser BPL is a wavelength band of about 300 nm to about 900 nm, the entire spectrum of the reflected pulse laser RPL may similarly have a wavelength band of about 300 nm to about 900 nm. Therefore, similarly to the first broadened pulse laser BPL1, the second broadened pulse laser BPL2, and the third broadened pulse laser BPL3, the first reflection pulse laser RPL1 may have a spectrum with a wavelength band of about 700 nm to about 900 nm, the second reflected pulse laser RPL2 may have a spectrum with a wavelength range of about 500 nm to about 700 nm, and the third reflection pulse laser RPL3 may have a spectrum with a wavelength range of about 300 nm to about 500 nm.

The first spectral image SIM1 generated by the first reflection pulse laser RPL1 may be generated with a spectrum having a wavelength band of about 700 nm to about 900 nm, the second spectral image SIM2 generated by the second reflected pulse laser RPL2 may be generated with a spectrum having a wavelength band of about 500 nm to about 700 nm, and the third spectral image SIM3 generated by the third reflection pulse laser RPL3 may be generated with a spectrum having a wavelength band of about 300 nm to about 500 nm. Accordingly, the optical imaging device 1 according to an embodiment may obtain a plurality of spectral images from a single pulse laser PL, and spectral ranges constituting the plurality of spectral images may be configured differently.

The first axis (X-axis) and the second axis (Y-axis) shown on the right side of FIG. 4 are the spatial coordinate axes of the captured image of the object (that is, the wafer W), and a first spectral image SIM1, a second spectral image SIM2, and a third spectral image SIM3 are depicted in time order based on the first segment, the second segment, and the third segment. The first to third spectral images SIM1, SIM2, and SIM3 may be included in a spectral image set SIM. That is, for the portion of the wafer W that is the subject of imaging, spectral images representing spatial coordinates including the X-axis direction and Y-axis direction, and intensity values on the time axis for each pixel may be obtained.

For example, depending on the arrival time of the broadened pulse laser BPL, it may be divided into N portions (N is a natural number of 2 or more) (for example, into a first broadened pulse laser to an Nth broadened pulse laser). The first extended pulse laser portion to the Nth extended pulse laser portion may be divided based on the start time T0 to the Nth time. Likewise, the reflected pulse laser RPL generated by reflection of the broadened pulse laser BPL on the wafer W may be divided into a first reflected pulse laser to an Nth expansion pulse laser. The first reflected pulse laser portion to the Nth extended pulse laser portion that reaches the light receiving device 310 may become the first to Nth spectral images, respectively. That is, one 3D hypercube including the first to Nth spectral images may be generated. As such, the example number of segments does not limit the optical imaging device according to an embodiment.

In conventional hyperspectral imaging devices, as a point scan method, a line scan method, and a method including a filter, there is a method of obtaining a two-dimensional (2D) spectral image by emitting light of a specific spectral band to an object through a filter and obtaining a multi-spectral spectral image by repeatedly changing the filter.

In the optical imaging device 1 according to an embodiment, the plurality of spectral images generated in different spectral ranges may be generated from one pulse laser PL. Because the pulse generating device 110 is a laser device and emits a pulsed laser PL at a very high repetition rate, the pulse generating device may significantly reduce the time required to image the object to obtain a 2D spectral image with improved throughput through a single pulse laser PL.

Accordingly, the optical imaging device 1 according to an embodiment may quickly obtain multiple spectral images of an object, and the time required to inspect and measure the object may be greatly reduced. For example, the repetition rate of the pulse laser PL may be several KHz to several MHz, and accordingly, the sampling frequency of the light receiving device 310 may be several KHz to several MHz. In an embodiment, the pulse generating device 110 may emit pulse laser PL at a repetition rate of about 400 kHz to about 1 MHz. That is, the optical imaging device 1 according to an embodiment may have improved measurement performance.

When the repetition rate of the pulse generating device 110 is greater than the sampling frequency of the light receiving device 310, the number of spectral image sets SIM generated per second may be equal to or less than the sampling frequency of the light receiving device 310. Alternatively, when the sampling frequency of the light receiving device 310 is greater than the repetition rate of the pulse generating device 110, the number of spectral image sets SIM generated per second may be equal to or less than the repetition rate of the pulse generating device 110.

When the spectral image set SIM of the same point on a wafer W is generated with two or more pulsed lasers PL generated by a pulse generating device 110, the smaller of the repetition rate of the pulse generating device 110 and the sampling frequency of the ICCD may be greater than the number of spectral image sets SIM produced per second or a multiple of the number of spectral image sets SIM produced per second.

When the sampling frequency of the light receiving device 310 is less than the repetition rate of the pulse generating device 110, and/or when the sampling of the reflected pulse laser RPL reaching the light receiving device 310 is inconsistent with the sampling of the light receiving device 310, the generation of the spectral image set SIM may not be performed smoothly. Accordingly, the repetition rate of the pulse generating device 110 may be equal to or less than the sampling frequency of the light receiving device 310. The sampling frequency of the light receiving device 310 may be about 1 MHz or less.

Figure 5:
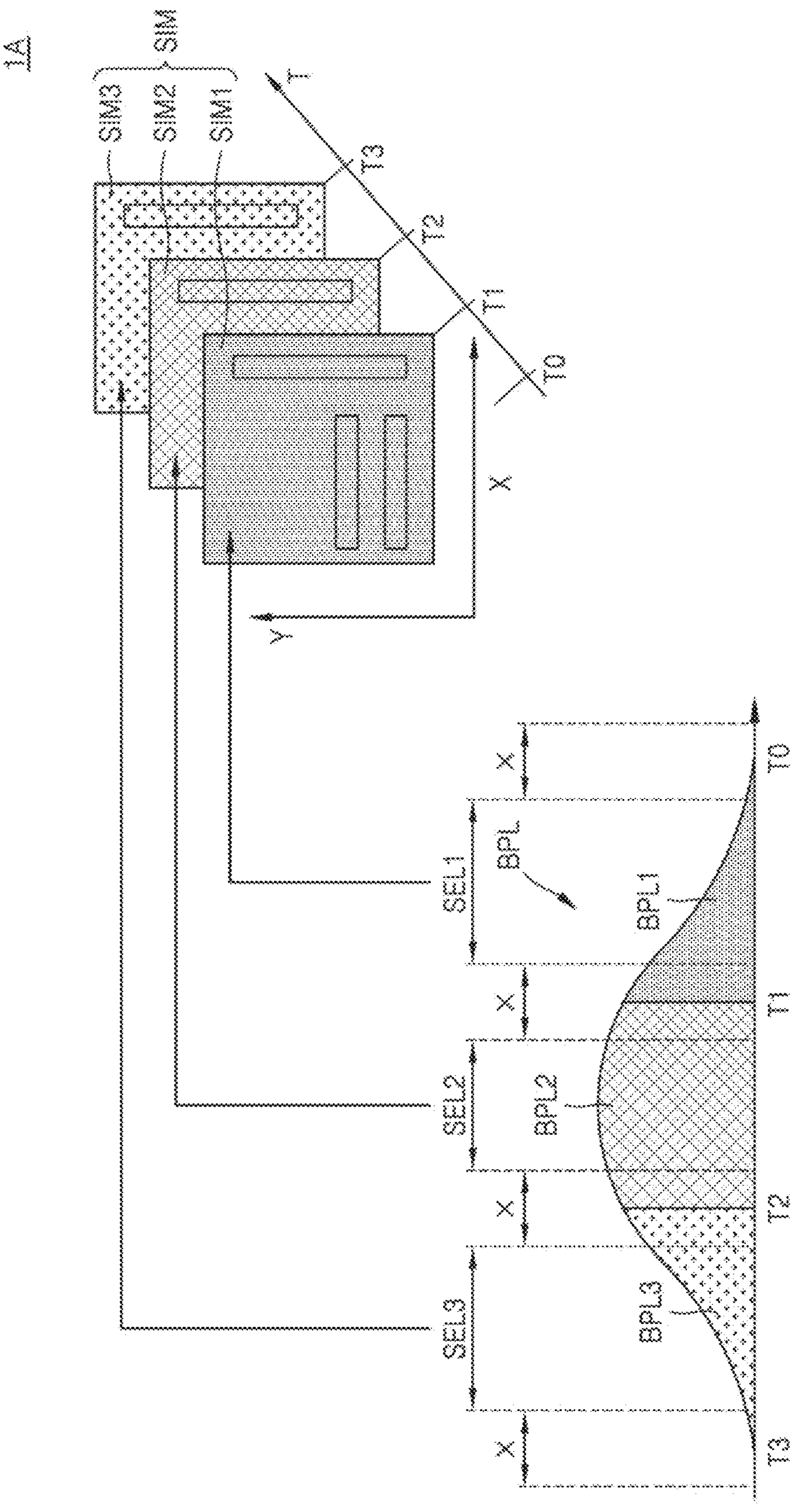
FIG. 5 is a diagram illustrating an optical imaging device according to one or more embodiments.

FIG. 5 is a diagram illustrating an optical imaging device 1A according to one or more embodiments.

Referring to FIGS. 1 and 5, the optical imaging device 1A according to an embodiment may have the same configuration as the optical imaging device 1 described above. As described above, the processor 320 may divide the time range into the first segment, the second segment, and the third segment and divide the reflected pulse laser RPL to generate a spectral image for each segment. Unlike the optical imaging device 1 described above, the optical imaging device 1A according to an embodiment may generate a spectral image excluding portions (identified as "x" in FIG. 5) of the reflected pulse laser RPL adjacent to the starting time T0, the first time T1, the second time T2, and the third time T3 which are respective times that serve as standards for dividing into the first segment, the second segment, and the third segment.

For example, as in FIG. 5, the processor 320 may generate a first spectral image SIM1 for the first selection range SEL1 between the start time T0 and the first time T1, excluding the range adjacent to the start time T0 and the first time T1 of the reflected pulse laser RPL, respectively. Likewise, the processor 320 may generate a second spectral image SIM2 for a second selection range SEL2 between the first time T1 and the second time T2, excluding the range adjacent to the first time T1 and second time T2 of the reflected pulse laser RPL, respectively. Generating the third spectral image SIM3 through the third selection range SEL3 is also similar to the above-described first selection range SEL1 and second selection range SEL2.

In the optical imaging device 1A according to an embodiment, the processor 320 may generate a spectral image using the electrical signal excluding the signal received by the light receiving device 310 when it is around the reference time for segmentation (i.e., excluding the signal corresponding to "x"). Through this, the quality of the generated spectral image may be improved by preventing or reducing the overlap of some spectral wavelength bands in different portions of the reflected pulse laser RPL received at adjacent times.

Figure 6:
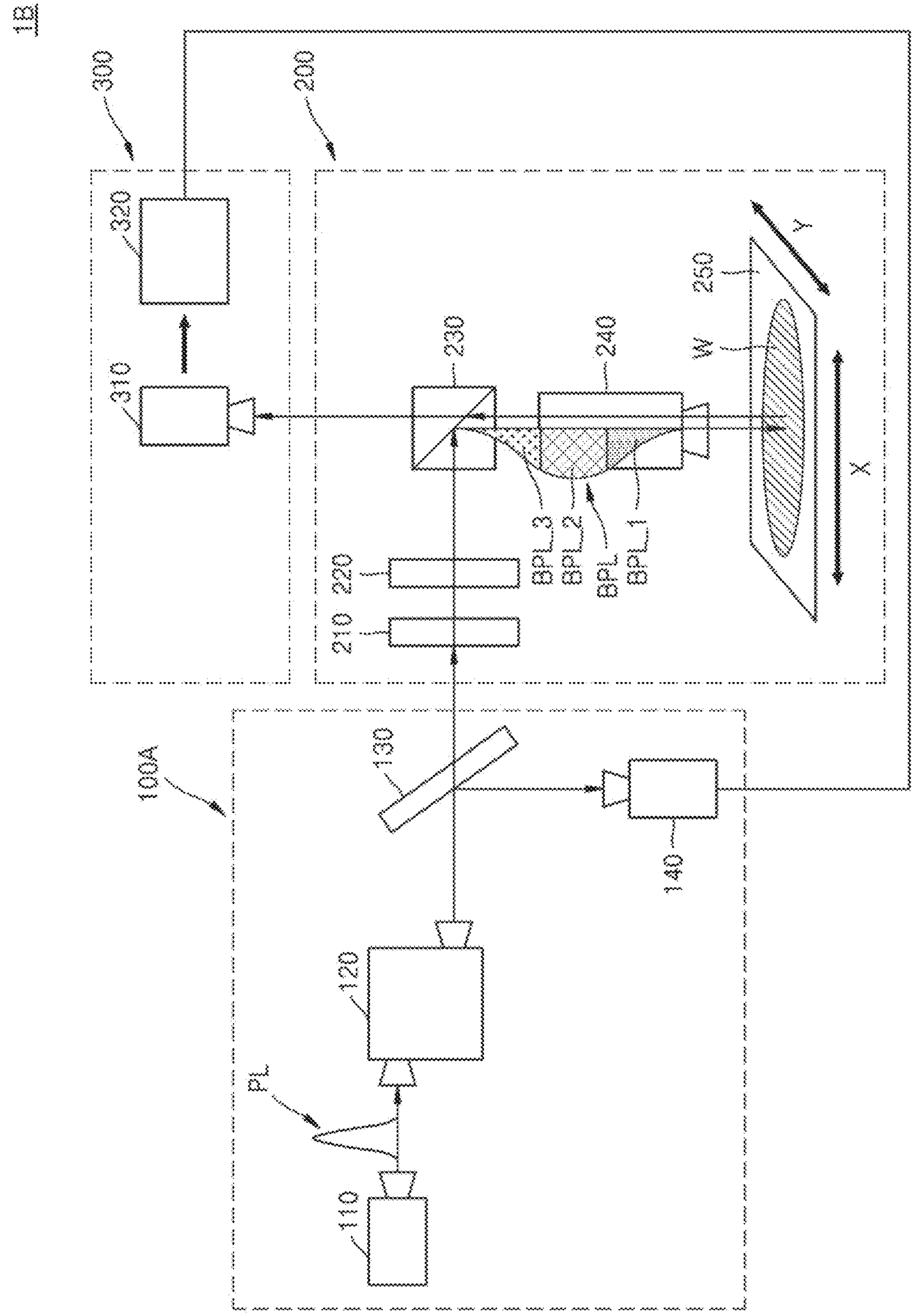
FIG. 6 is a diagram illustrating an optical imaging device according to one or more embodiments.

FIG. 6 is a diagram illustrating an optical imaging device 1B according to one or more embodiments. In describing the optical imaging device 1B, descriptions already given may be omitted.

Referring to FIG. 6, the optical imaging device 1B may further include a second beam splitter 130 (e.g., an intermediate beam splitter) and an intermediate light receiving device 140. The second beam splitter 130 may be disposed on the optical path between the pulse expander 120 and the first beam splitter 230, allowing some of the broadened pulse laser BPL to pass through and causing the remaining portions of the broadened pulse laser BPL to branch. The branched broadened pulse laser BPL may enter the intermediate light receiving device 140.

The intermediate light receiving device 140 may convert the branched expansion pulse laser branched from the second beam splitter 130 into an intermediate electrical signal and transmit the intermediate electrical signal to the processor 320. The processor 320 may analyze the frequency and intensity of each wavelength of the spectrum of the branched expansion pulse laser light received by the intermediate light receiving device 140 and may perform normalization of the reflected pulse laser RPL received from the light receiving device 310 or the spectral image set SIM generated from the reflected pulse laser RPL. Distortion of the spectral image caused by strong or weak intensity in some wavelength ranges of the spectrum of the reflected pulse laser RPL may be reduced through normalizing. Accordingly, the optical imaging device 1B according to an embodiment may improve the quality of spectral images.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the devices, units, components, modules, units, or the like represented by a block or an equivalent indication in the above embodiments including FIGS. 1-6 may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A hyper-spectral imaging device comprising:
- a femtosecond pulse generating device configured to generate pulse lasers;
- a pulse expander configured to:
  - receive a pulse laser from the femtosecond pulse generating device; and
  - generate a broadened pulse laser by expanding a spectrum and a width of the received pulse laser;
- an intermediate beam splitter configured to:
  - receive the broadened pulse laser from the pulse expander; and
  - branch a first portion of the received broadened pulse laser and transmit a second portion of the received broadened pulse laser;
- an intermediate light receiving device configured to receive the first portion of the broadened pulse laser branched from the intermediate beam splitter;
- a first beam splitter configured to receive the second portion of the broadened pulse laser and output the second portion of the broadened pulse laser in one direction;
- an objective lens configured to receive the second portion of the broadened pulse laser and pass the received second portion of the broadened pulse laser to a target object;
- an intensified charged coupled device (ICCD) configured to:
  - receive a reflected pulse laser corresponding to the second portion of the broadened pulse laser reflected from the target object; and
  - convert the reflected pulse laser into a first electrical signal; and
- at least one processor configured to:
  - generate a three-dimensional (3D) hypercube comprising a plurality of spectral images based on the first electrical signal;
  - receive an intermediate electrical signal generated based on the first portion of the broadened pulse laser, and
  - normalize the 3D hypercube based on the intermediate electrical signal.

2. The hyper-spectral imaging device of claim 1, wherein the at least one processor is further configured to:
- divide one reflected pulse laser into N segments based on a reception time of each portion of the reflected pulse laser; and
- generate a spectral image for each of the first to Nth segments in order of reception time,
- wherein the 3D hypercube comprises a first spectral image for the first segment, to an N-th spectral image for the N-th segment, and
- wherein N is a natural number of 2 or more.

3. The hyper-spectral imaging device of claim 2, wherein the at least one processor is configured to generate the 3D hypercube based on a N selection ranges respectively corresponding to the first to Nth segments of the reflected pulse laser, and
- wherein each of the N selection ranges is determined based on excluding an initial time period for time ranges respectively corresponding to each of the first to Nth segments of the reflected pulse laser.

4. The hyper-spectral imaging device of claim 1, wherein the smaller of a repetition rate of the femtosecond pulse generating device and a sampling frequency of the ICCD is equal to a number of generations per second of the 3D hypercube, or is a multiple of a number of generations per second of a spectral image set.

* * * * *